United States Patent [19]

Bueno et al.

[11] 4,394,122
[45] Jul. 19, 1983

[54] FURNACE REGENERATOR WITH IMPROVED FLOW DISTRIBUTION

[75] Inventors: Alejandro G. Bueno, Toledo; K. Lawrence Stover, Genoa, both of Ohio

[73] Assignee: Libbey-Owens-Ford Company, Toledo, Ohio

[21] Appl. No.: 302,641

[22] Filed: Sep. 15, 1981

[51] Int. Cl.³ .......................... F24H 7/00; F27D 17/00
[52] U.S. Cl. ...................................... 432/30; 432/180; 432/181
[58] Field of Search ................... 432/30, 180, 181, 182

[56] References Cited

U.S. PATENT DOCUMENTS 4,088,180  5/1978  Tsai ........................................ 432/180
4,174,948  11/1979 Bradley et al. ......................... 432/54
4,257,476  3/1981  Tsai ........................................ 165/93

FOREIGN PATENT DOCUMENTS 766643  1/1957  United Kingdom ................ 432/181

Primary Examiner—John J. Camby
Attorney, Agent, or Firm—Collins, Oberlin & Darr

[57] ABSTRACT

A continuous regenerative tank-type glass melting furnace having a plurality of burner ports along each side in communication with a longitudinally extending plenum. Beneath and extending throughout the length of each plenum is a checkerbrick structure supported upon longitudinally extending arches carried by transverse walls. The walls divide the area beneath the checkerbricks into a plurality of chambers, each chamber being below a corresponding one of the ports. A tunnel joins each chamber to a common manifold connected to a reversing combustion air and exhaust gas system. Each tunnel is provided with a damper for varying its effective cross-sectional area, thereby permitting improved regulation of the flow distribution of exhaust gases and combustion air through the regenerators.

10 Claims, 3 Drawing Figures

FURNACE REGENERATOR WITH IMPROVED FLOW DISTRIBUTION

BACKGROUND OF THE INVENTION

1. Field of the Invention

The present invention relates broadly to continuous tank-type regenerative glass melting furnaces, and more particularly to an improved regenerator system for such furnaces.

2. Description of the Prior Art

Large, high capacity continuous melting furnaces of the tank type employed in producing flat glass have generally included a number of burner ports spaced along either side at the upstream or charging end of the furnace. Conventionally, five to seven such ports may be employed, with each set of ports being connected to an associated regenerator extending along side the tank. The system is periodically cycled or reversed so that alternately, heated exhaust gases are withdrawn through the set of ports to store heat in the associated checkerbrick structure of the regenerator, or so-called checkers, and then combustion air is forced through the checkers to absorb the stored heat and thus be preheated prior to admission to the furnace melting zone through the ports.

Heretofore, conventionally in such furnaces combustion air has been admitted and exhaust gases withdrawn through tunnels extending throughout the length of and lying beneath the checkerwork structure of the regenerators. More particularly, due to the width of the regenerators the tunnel was provided with a longitudinally extending center support wall upon which transverse rider arches were supported for carrying the checker structure thereabove. The combustion air was introduced to and the exhaust gases were withdrawn from the tunnels at the upstream or charging end of the furnace.

Although the tunnels extend throughout the entire length of the regenerators on each side of the furnace, it has been found that because of flow characteristics including the tendency for the gases to follow the path of least resistance through the checkers, withdrawal of hot exhaust gases is predominantly through the upstream end of the regenerators. Conversely, as colder incoming combustion air is admitted to the tunnel, it travels predominantly to the far or downstream end of the regenerators. Thus, there is a tendency to create non-uniform gas flow and temperature patterns along the length of the regenerators. This compounding effect, wherein a disproportionate share of the hot combustion gases is withdrawn through the checkers in the vicinity of the first port while a disproportionate share of the cooling combustion air is drawn through the checkers in the vicinity of the last port, tends to create a temperature gradient within the checkers whereby the temperature at the upstream end, that is, in the vicinity of the first port, is considerably higher than at the downstream end.

Such a condition may both reduce the thermal efficiency of the furnace and accelerate deterioration of the regenerators due to abnormally high localized temperatures. Thus, due to the concentration of stored heat in certain areas and consequent deficiency of stored heat in other areas, the efficiency with which the combustion air is preheated and the fuel is utilized during the firing cycle is reduced. Also, the areas of high exhaust gas flow are subjected to excessive batch dust carryover from the tank, whereby some of the passages in the checkers may eventually become blocked, while the areas of lower brick temperatures are more susceptible to damaging sodium sulfate condensation.

Various schemes have been proposed for alleviating this problem. For example, particularly in connection with smaller furnaces as employed in the container industry, it has been proposed to subdivide the regenerators by vertical walls to, in effect, provide a separate regenerator chamber for each port or small group of ports. U.S. Pat. No. 4,174,948, issued Nov. 20, 1979 to Bradley et al., suggests separate intake air and exhaust gas manifolds extending along each regenerator, with branch ducts to the tunnel beneath each port, and valve or damper means in each branch duct which cycle upon each reversal of firing to regulate the flow of combustion air and exhaust gas through the associated checkers. In commonly assigned application Ser. No. 123,559 of Stover et al., filed Feb. 22, 1980, there is disclosed the concept of admitting combustion air at both ends of the tunnel beneath the checkers whereby the opposed flow tends to equalize operating temperatures throughout the length of the regenerator. While these and other prior art proposals have been beneficial in many instances, they have not entirely alleviated the problem.

SUMMARY OF THE INVENTION

In accordance with the present invention, there is provided a continuous regenerative tank-type glass melting furnace having a plurality of burner ports along either side of the furnace. Individual transversely extending passageways beneath the checkers connect that portion of the regenerator associated with each port to a common longitudinally extending tunnel which alternately supplies combustion air to and ventilates exhaust gases from the individual passageways. An adjustable damper is provided in each passageway, and the dampers are set so that the effective cross-sectional areas of the several passageways are so interrelated as to result in substantially equal flow of combustion air to and exhaust gas from each of the associated ports. Once set, the dampers remain stationary during operation of the furnace except for periodic and infrequent adjustment to compensate for changing operating conditions and to fine tune, that is, more precisely regulate the relative flow between the passageways.

It is, therefore, a primary object of the invention to improve the efficiency of fuel utilization in a regenerative furnace having a plurality of firing ports.

Another object of the invention is to equalize the flow of gases, and hence the temperatures, throughout the length of a regenerator of a multi-port furnace.

Another object of the invention is to lengthen the service life of the regenerators of such a furnace.

Still another object is to provide an elongated regenerator coupled to a plurality of firing ports with a system for controlling flow through the individual ports which is relatively simple, durable and maintenance free.

Other objects and advantages will become more apparent during the course of the following description, when taken in connection with the accompanying drawings.

BRIEF DESCRIPTION OF THE DRAWINGS

In the drawings, wherein like numerals refer to like parts throughout.

DESCRIPTION OF THE PREFERRED EMBODIMENT

Figure 1:
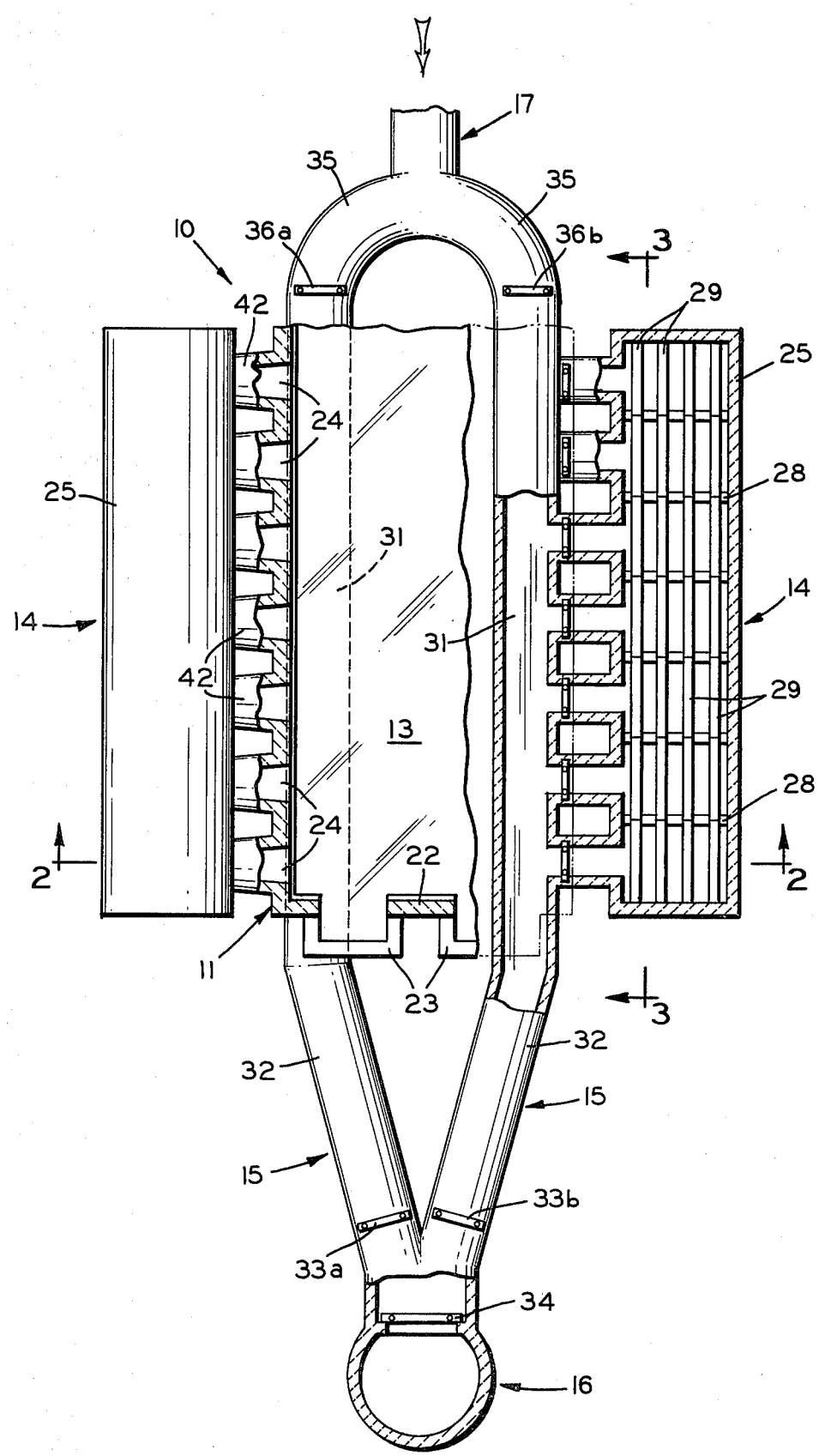
FIG. 1 is a plan view, partly in section, of the melting end portion of a typical regenerative glass melting furnace incorporating the invention.
Figure 2:
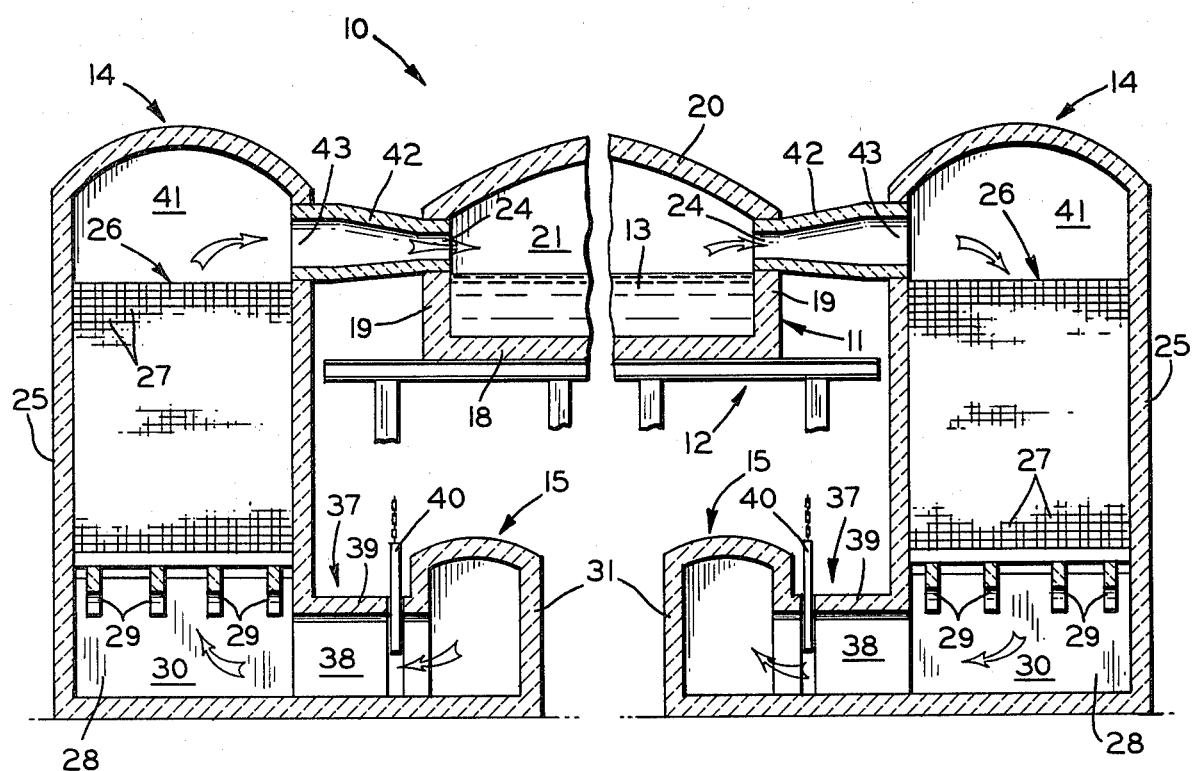
FIG. 2 is a transverse elevational view taken substantially along line 2—2 of FIG. 1.

Referring now to the drawings, there is shown generally in FIG. 1 the melting end of a continuous regnerative tank-type glass melting furnace 10 embodying the invention. More particularly, the furnace includes a tank portion 11 supported by a structural framework 12 and containing a mass of molten glass 13 (FIG. 2). Extending longitudinally along either side of the tank is a regenerator structure 14 connected at one end by means of tunnels 15 to an exhaust stack 16. At their opposite end the tunnels 15 are connected by means of a conduit 17 to a source of combustion air (not shown). While in its preferred embodiment the invention has been illustrated with the combustion air being admitted at the end of the checkers opposite the tunnels 15 leading to the exhaust stack 16, it will be appreciated that the combustion air may in some instances instead be admitted at the end at which the exhaust gases are withdrawn as has heretofore been customary in conventional furnaces of this type.

As best illustrated in FIG. 2, the tank 11 includes a floor 18 and sidewalls 19 defining the cavity within which the molten glass 13 is contained, and an arch or cap 20 forming an enclosed headspace 21 over the molten glass. The upstream end of the tank (FIG. 1) is provided with an end wall 22 having feeding extensions or so-called dog houses 23 extending therefrom to which glass making ingredients are conventionally supplied for melting and integration into the molten glass 13. Burner ports 24 are provided in the side walls 19 above the surface of the molten glass for admitting a combustible fuel to the headspace 21 and removing the products of combustion therefrom as will be hereinafter more fully explained.

The regenerators 14 include a refractory enclosure 25 within which is contained a checkerwork structure 26 built up of courses of individual refractory bricks 27 spaced so as to provide avenues for passage of combustion air and exhaust gases therethrough in the customary fashion.

As illustrated in the aforementioned copending application Ser. No. 123,559, regenerators for large melting furnaces of the type with which the present invention is concerned have heretofore generally been constructed with a longitudinally extending central support wall which divides the chamber beneath the checkerwork structure into two sections. The central wall supports one end of so-called rider arches extending transversely of the regenerator, and the checkerwork structure is in turn, supported upon the rider arches.

In order to permit individualized control over the flow of combustion air and exhaust gases through the checkers in the region of each of the individual ports 24 as will be hereinafter explained, the regenerators of the present invention are provided with a transversely extending support wall 28 (FIG. 3) beneath the checkerwork structure 26 between each adjacent pair of burner ports 24. Rider arches 29 carried by the support walls 28 extend longitudinally of the regenerator, with the checker structure 26 being built up from and supported upon the rider arches.

The walls of the refractory enclosure 25 and the support walls 28 create a chamber 30 beneath and open upwardly to the portion of the checkerwork structure 26 adjacent each of the ports 24. The tunnels 15 each include a manifold section 31 extending along the lower portion of the refractory enclosure 25 adjacent the chambers 30 and an exhaust section 32 connecting the manifold section to the stack or chimney 16. Conventionally located within the two exhaust sections 32 are dampers 33a and 33b which alternately open and close upon reversal of the firing cycle as will be hereinafter explained. A sliding damper 34 may also conventionally be located at the entrance to the stack 16 for suitably controlling the amount of draft to which the tunnel 15 is subjected by the stack. At the opposite end the manifold sections 31 are connected by ducts 35 to the combustion air conduit 17. Inlet dampers 36a and 36b in each of the ducts 35 operate in conjunction with the dampers 33a and 33b in the exhaust sections 32 so that alternately, combustion air is supplied to the manifold section 31 along one side while exhaust gases are withdrawn through other manifold section for a given period, and then the flow is reversed.

Each of the chambers 30 beneath the checker structure 26 is in communication with its adjacent manifold section 31 through a connecting duct 37. More specifically, as will be apparent in FIGS. 2 and 3, the connecting duct may include refractory side walls 38 spanned by an arch 39, with the connecting duct opening into the side walls of the refractory enclosure 25 and the manifold section 31. In order to provide for regulation of gas flow between the chamber 30 and manifold 31 through the connecting ducts 37, there is provided in each connecting duct a suitable valve or regulating device such as a vertically adjustable gate valve 40 of conventional construction. The gate valve is provided with suitable conventional lifting mechanism (not shown) by which it can be manipulated upwardly or downwardly as desired to effectively vary the cross-sectional area of the connecting duct 37 and thereby throttle or restrict flow through the duct as may be appropriate.

Above the checkerwork structure 27 within the refractory enclosure 25 of each regenerator is an open plenum space 41 extending throughout the length of the regenerator. Snouts 42 extending from openings 43 spaced along the wall of the refractory enclosure 25 facing the tank 11 connect the open plenum 41 with the individual burner ports 24 in the conventional manner. Appropriate burners (not shown) may be inserted through the walls of the snouts to supply liquid or gaseous fuels in the usual manner.

Figure 3:
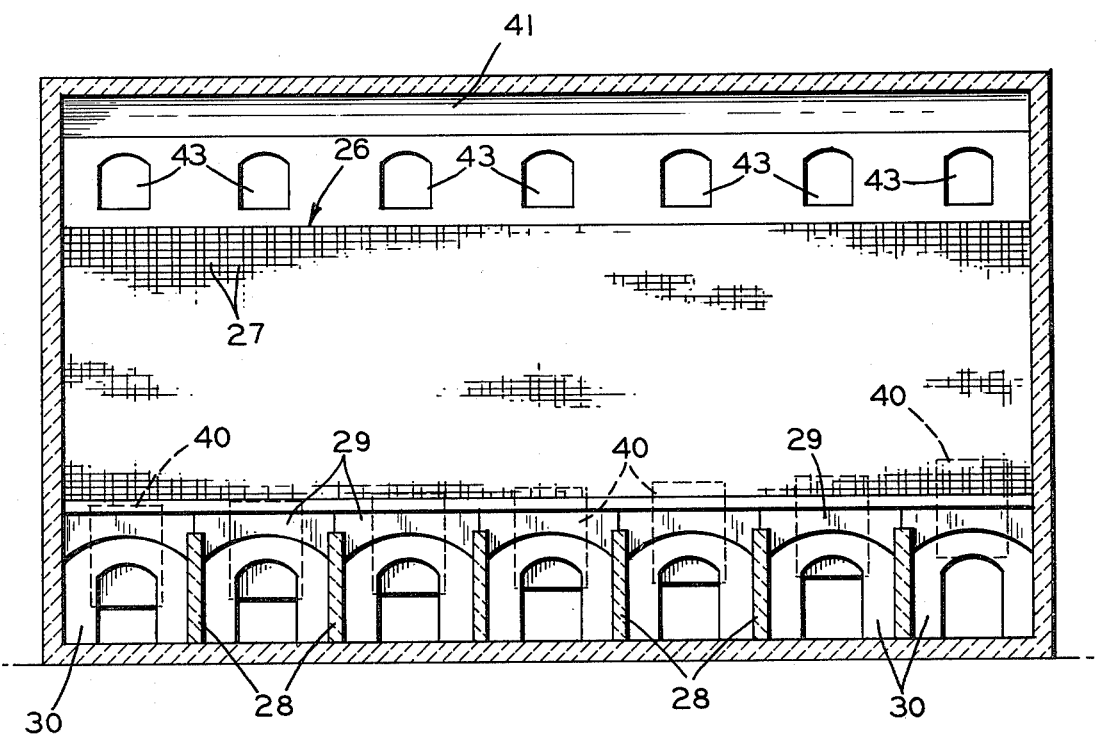
FIG. 3 is a longitudinal elevational view of the regenerator taken substantially along line 3—3 of FIG. 1.

Briefly describing operation of the melting furnace embodying the invention, it will be appreciated that while the checkerwork structure 26 and open plenum space 41 permit lateral flow of combustion air and exhaust gases throughout the length of the regenerator as in the corresponding portions of conventional furnaces, admission to and withdrawal from individual chambers 30 through the connecting ducts 37 can be regulated by the adjustable gate valves 40. Thus, in contrast to prior art regenerators having open plenums beneath the checkerwork structure, movement of the air and gases through the checkerwork structure can be generally confined to the region between each individual chamber 30 and its associated port 24. To this end, based upon empirical data and the knowledge of experienced operators it can be determined in advance at approximately what height the gate valves 40 should be set, that is, the ratios of effective cross-sectional areas of the various connecting ducts necessary to properly apportion the gas flow through the checkerwork structure. For example, as illustrated in FIG. 3 the gate valve 40 beneath the first port of the furnace may be lowered so that the effective area of the connecting duct is only about three-fifths of its total area. The gate valves at successive ports downstream are progressively higher until at the last port the full area of the connecting duct may be employed, that is, the gate valve is raised above the duct opening.

Combustion air is supplied through the conduit 17 to the ducts 35 as shown by the arrow in FIG. 1. The arrows in FIG. 2 illustrate the direction of flow with the furnace being fired on the left side, and thus the inlet damper 36a and exhaust damper 33b would be open while the inlet damper 36b and exhaust damper 33a would be closed. With the dampers thus arranged, combustion air enters the left manifold section 31 where it is directed to the various connecting ducts 37 and chambers 30 beneath the checkerwork structure 26, with the adjustable gate valves 40 providing an effective cross-sectional area for the connecting ducts whereby the combustion air is apportioned among the chambers 30 to give the deisred flow relationship through the checkerwork structure.

The combustion air absorbs heat from the refractory bricks 27 as it rises through the checkerwork structure to the open plenum space 41, and then is directed through the snouts 42 and burner ports 24, where a combustible fuel is conventionally injected into the stream of preheated air. The fuel ignites in the presence of the combustion air within the headspace 21, supplying heat to the body of molten glass 13 and newly added glass making materials, and creating products of combustion or exhaust gases. As further illustrated by the arrows in FIG. 2, these exhaust gases are withdrawn through the ports 24 and snouts 42 on the opposite side of the furnace, downwardly through the checkerwork structure and out through the connecting ducts 37 to the associated manifold 31. Thereafter the spent exhaust gases are carried by the exhaust section 32 to the stack 16. As they pass through the checkers the exhaust gases heat the refractory bricks 27. The gate valves 40, since they are set to reduce the effective area of the connecting ducts 37 more at the upstream than at the downstream end of the furnace, restrict the flow of combustion gases at the upstream or charging end relative to the downstream end, thereby causing a greater proportion of the hot gases to be withdrawn through the downstream portion of the checkerwork structure contrary to the natural tendency in conventional regenerators.

At periodic intervals, for example in cycles on the order of fifteen minutes in duration, the dampers 33a, 33b, 36a and 36b are reversed and the burners along the opposite side are fired so that each checkerwork structure 26 alternately stores heat while exhaust gases are being withdrawn therethrough and supplies heat to the combustion air as it is being admitted to the burner ports.

Although the adjustable gate valves 40 are preset and need not be adjusted upon reversal of firing, they are nevertheless adjustable and may be moved as necessary to give the precise gas flow and temperature patterns desired within the regenerators. It will be obvious, for example, that a number of factors such as rate of fill, type of glass being produced and age of the furnace might necessitate minor adjustment of the gate valves for optimum operation.

It is believed apparent there is provided in accordance with the invention a relatively simple regenerator system for glass melting furnaces requiring little or no maintenance, and yet which is trouble-free and effective over the life of the furnace.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. In a method of equalizing the flow of exhaust gas and combustion air throughout the length of elongated regenerators extending along either side of the melting area of a continuous tank-type glass melting furnace, wherein the regenerators include an elongated checkerwork structure defining a multitude of gas passageways extending the complete length of the associated regenerator and having an open plenum space thereabove communicating with a plurality of ports spaced along the melting area, the improvement comprising alternately supplying combustion air to and withdrawing exhaust gas from said regenerators through a plurality of upwardly open chambers spaced therealong and below said checkerwork structure, and apportioning the flow of combustion air supplied and exhaust gases withdrawn among said chambers so as to produce more uniform flow of combustion air and exhuast gases through said checkerwork structure throughout the length thereof.

2. A method of equalizing the flow throughout the length of elongated regenerators as claimed in claim 1, wherein one of said chambers is located below each one of said ports.

3. A method of equalizing the flow throughout the length of elongated regenerators as claimed in claim 1, wherein combustion air is supplied and exhaust gases are withdrawn at each said chamber through an individual tunnel, and the flow is apportioned among said chambers by varying the effective cross-sectional area of said individual tunnels.

4. A method of equalizing the flow throughout the length of elongated regenerators as claimed in claim 3, wherein each said tunnel includes a gate valve, and the effective area of said tunnel is varied by changing the position of said gate valve.

5. In a reversing, regenerative, continuous glass melting furnace of the type including an elongated tank having a melting area with a plurality of ports spaced along either side thereof, a regenerator extending along each side of the melting area of said tank and in communication with the adjacent ports, a checkerwork structure within each said regenerator and defining a multitude of gas passageways extending the complete length of the associated regenerator, and means alternately supplying combustion air through said checkerwork structure to said ports and withdrawing hot exhaust gases through said checkerwork structure from said ports, the improvement wherein said means supplying combustion air and withdrawing exhaust gases comprises a manifold extending along each said regenerator below said checkerwork structure, a plurality of ducts spaced along said manifold connecting said manifold to said regenerator structure through individual upwardly open chambers spaced therealong below said checkerwork structure, means alternately supplying combustion air to and withdrawing exhaust gases from said manifold, and means regulating flow through each said duct for apportioning the flow among the ducts and thereby tending to equalize the flow of combustion air and exhaust gases through said checkerwork structure and ports throughout the length of said regenerator.

6. A reversing, regenerative, continuous glass melting furnace as claimed in claim 5, wherein said means regulating flow through each said duct comprises means operable to selectively vary the effective cross-sectional area of each said duct.

7. A reversing, regenerative, continuous glass melting furnace as claimed in claim 5, wherein each said regenerator includes a transversely extending support wall between each pair of adjacent ducts upon which said checkerwork structure is supported, thereby defining one of said chambers beneath said checkerwork structure in communication with each said duct.

8. A reversing, regenerative, continuous glass melting furnace as claimed in claim 7, wherein one of said chambers and said ducts is located beneath each of said ports.

9. A reversing, regenerative, continuous glass melting furnace as claimed in claim 5, including a support wall extending transversely across said regenerator between each pair of adjacent ports, said support walls and regenerator side and end walls defining said chambers, and longitudinally extending rider arches supported upon the spaced support walls, said checkerwork structure being supported upon said rider arches.

10. A reversing, regenerative, continuous glass melting furnace as claimed in claim 5, 7, 8 or 9, wherein said means regulating flow through each said duct comprises a vertically adjustable gate valve for each said duct and means regulating the vertical position of each gate valve for determining the effective cross-sectional area of the associated duct to thereby apportion the flow among said plurality of ducts connected to each regenerator.

* * * * *